Jan. 28, 1958 H. G. BECK 2,821,244
RESILIENT CUSHION
Filed Nov. 23, 1955 2 Sheets-Sheet 1
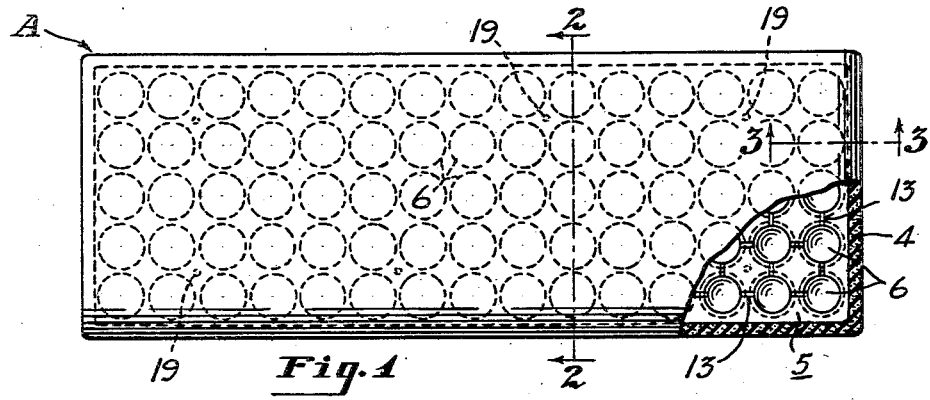
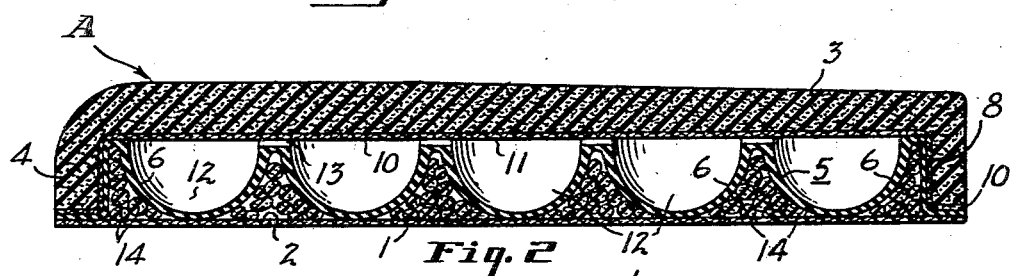
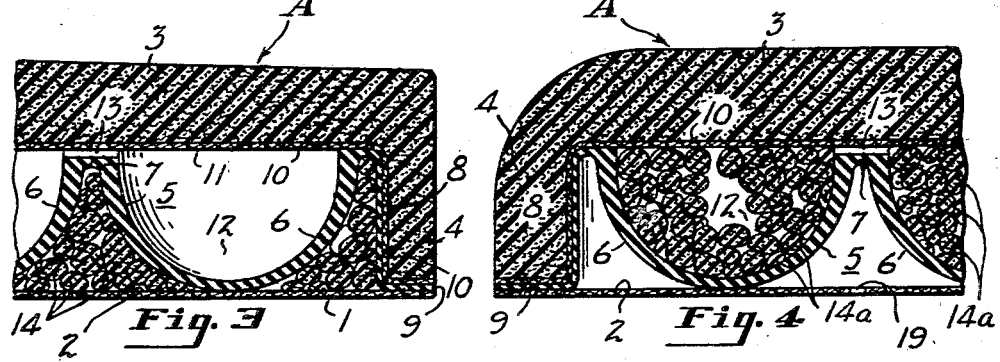
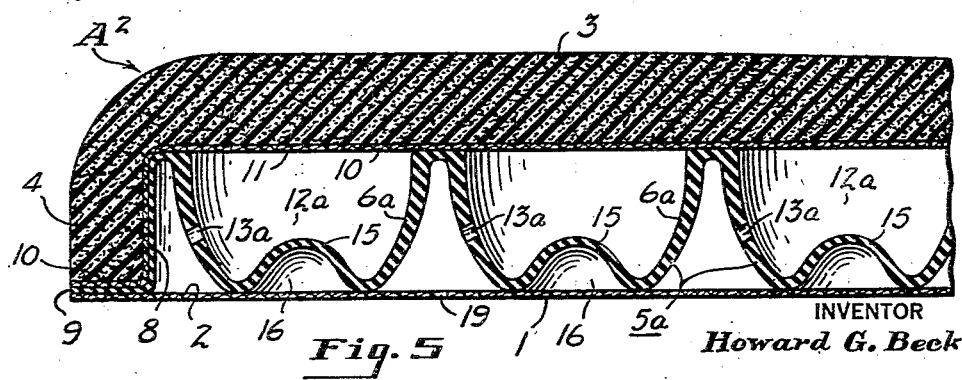
INVENTOR
Howard G. Beck
BY McCoy, Greene & Te Grotenhuis
ATTORNEYS Jan. 28, 1958    H. G. BECK    2,821,244
RESILIENT CUSHION
Filed Nov. 23, 1955    2 Sheets-Sheet 2

INVENTOR
Howard G. Beck
BY McCoy, Greene + te Grotenhuis
ATTORNEYS 2,821,244
Patented Jan. 28, 1958

United States Patent Office

2,821,244
RESILIENT CUSHION

Howard G. Beck, Wabash, Ind., assignor to The General Tire and Rubber Company, Akron, Ohio, a corporation of Ohio Application November 23, 1955, Serial No. 548,702

15 Claims. (Cl. 155—179)

The present invention relates to a resilient cushion and more particularly to a soft pneumatic seat cushion suitable for motor vehicles or the like.

According to the present invention a cushion is provided having a series of collapsible cup-like members of elastic rubber-like material forming a series of contractible chambers. Small passages are provided for establishing a restricted fluid communication between the chambers so as to provide means for damping movements of the cushion. The walls of each cup-like member preferably gradually decrease in thickness toward the margin of the member so that the resistance of the member to deformation gradually increases as the deformation increases. Due to the shape of the member, the stiffness of the member at small deflection is much less than that of a conventional spring having a stiffness at high deflection comparable to that of said member.

An object of the invention is to provide an improved seat cushion of simple and inexpensive construction.

A further object of the invention is to provide a comfortable cushion of improved design suitable for modern automobiles.

A still further object of the invention is to provide a cushion which may be readily manufactured using vulcanized rubber material.

Other objects, uses and advantages of the present invention will become apparent to those skilled in the art from the following description and claims and from the drawings, in which:

Figure 1 is a top plan view on a reduced scale of the cushion of the present invention with parts broken away;

Figure 2 is a transverse vertical sectional view taken substantially on the line 2—2 of Fig. 1 and on a larger scale;

Figure 3 is a fragmentary longitudinal vertical sectional view taken substantially on the line 3—3 of Fig. 1 and on a larger scale;

Figure 4 is a fragmentary transverse vertical sectional view on the same scale as Fig. 3, showing a modified form of the invention;

Figure 5 is a fragmentary transverse vertical sectional view on the same scale as Figs. 3 and 4 showing another modified form of the invention;

Figure 6:
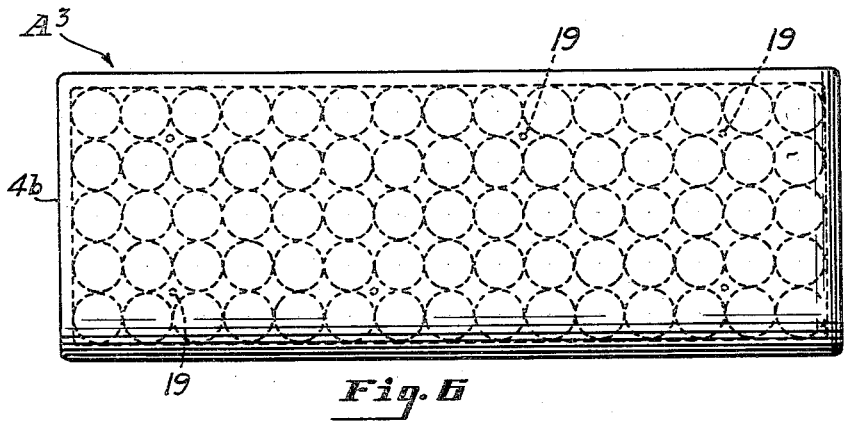
Figure 6 is a top plan view on a reduced scale showing another modified form of the invention.

Referring more particularly to the drawings which are drawn substantially to scale and in which like parts are identified by the same numerals throughout the several views, Figs. 1 to 3 show a rectangular seat cushion A suitable for various types of furniture and particularly for use in modern automobiles. The cushion comprises a thin, flat, flexible, bottom sheet 1 of rectangular form having a smooth, flexible surface 2 and a plurality of small openings 19 therein; a relatively thick, extra soft, elastic, sponge rubber cover 3 having a thick, endless, marginal portion 4 of rectangular shape projecting toward said bottom sheet 1; and a relatively thin, flexible sheet 5 of elastic rubber or other elastic, rubber-like material molded in a single piece to form a multiplicity of cups 6 sandwiched between the flexible surface 2 and the inner surface of the cover 3. As shown in Figs. 1 to 4, the cups 6 are hemispherical and are arranged in parallel rows extending along the length and width of the cushion parallel to the side and end walls of the cushion. The marginal edges of the cups are arranged in the same plane and are integrally joined by thin, connecting portions 7 adjacent the flat, inner surface of the cover 3. The sheet 5 extends along the inner surfaces of the marginal portion 4 from the outermost cups 6 and outwardly along said sheet to form an upright, peripheral wall 8 and a flat, marginal portion 9 of rectangular shape. Said sheet may be made from a conventional tread or carcass compound and preferably has a durometer of about 40 to 60. The sheet may, for example, be a GR–S non-set stock with a durometer of 50.

The inner surface of the sponge rubber cover 3 is preferably covered by a thin, flexible sheet 10, particularly where the cover has an open cell structure. The sheet 10 has a flat, rectangular, flexible surface 11 substantially parallel to the surface 2 that engages the marginal edges of all the cups 6 and has marginal portions that conform to the marginal portion 4 of the cover. Each of the cups 6 is of the same height so as to extend the full distance between the flexible surfaces 2 and 11. The cups 6 divide the space between said flexible surfaces into a series of rows of hemispherical air chambers 12 which are closed at one end by the rubber sheet 10. In order to establish communication between the chambers 12, passages may be provided between the chambers or between each chamber and the space between the sheets 1 and 5. Where all of the cups are molded in a single sheet, the passages are preferably formed in the sheet. As shown herein, a passage 13 is formed in the sheet 5 between each chamber 12 and the next adjacent chamber 12 to establish limited communication between the chambers. Since the passages 13 are relatively small in cross section, they provide a dash-pot action and serve as damping means for the cushion. The small openings 19 have a similar action. When one end of the cushion is compressed, the air will flow through the passages 13 toward the uncompressed portions of the cushion. The cushion is particularly comfortable since there is a short time delay after removal of pressure from the cushion before it resumes its original position.

The sheets 1 and 10 are preferably cut from sheets of single-ply, rubberized, cross-woven fabric and cemented to the marginal portion 9 of the sheet 5. The top sheet 10 is cemented to or vulcanized to each of the cups 6 so as to close each of the chambers 12. The sponge rubber cover 3 may be formed in a separate operation and thereafter cemented to the top sheet 10. Where the cover is formed of "Moltopren" it may be cemented to the sheet 10 after it is poured and shaped, or it may be poured in a suitable mold against the cemented surface of the sheet 10.

Each cup 6 is preferably of the same size and shape and has a hemispherical wall that gradually increases in thickness from its central to its marginal portion. The wall shown has inner and outer hemispherical surfaces each of uniform radius, the radius of the outer surface being slightly greater than that of the inner surface. The minimum thickness of said hemispherical wall at the center or nadir thereof is preferably about 40 to 60 percent less than the maximum thickness thereof at its margin, and the vertical height of the wall is preferably about 5 to 15 times its average thickness. Since the central portion of each cup is thinner than its marginal portion, its stiffness at small deflection is low compared to that of a conventional spring having a comparable stiffness at high deflection.

The air spaces formed between the sheet 5 and the flat flexible surfaces 2 and 11 may be filled with air or some other gas or may be partially filled with a soft compressible material, such as sponge rubber. As shown in Figs. 2 and 3, the spaces between the cups 6 and the bottom wall 1 contain small pieces 14 of soft, deformable, elastic, scrap sponge rubber.

The soft elastic cellular material employed for the cover 3 and the scraps 14 may be an elastic, porous, polyurethane plastic, such as "Moltopren," made by the reaction of a polyisocyanate on a reactive, organic polyester with simultaneous evolution of a blowing gas through a reaction involving isocyanate groups. Said cellular material may, for example, be a cellular reaction product of a polyester and polyisocyanate as disclosed in the copending application of C. B. Frost, Serial No. 541,823, filed October 20, 1955. Such material will be so full of pores or cavities that it weighs less than 30 pounds per cubic foot. Soft commercial sponges, such as "Polyphom" or "Moltopren" provide an excellent material for the cushion of the present invention. However, it will be understood that other soft, elastic, sponge rubber materials may also be used.

Figure 4 shows a modified cushion A' according to the present invention wherein these spaces are filled only with air and the chambers 12 contain sponge rubber scraps 14a.

Figure 5 shows a modified seat cushion A² which is the same as the cushion A except that the sponge rubber scraps are omitted and the rubber sheet 5 is replaced by a thin, flexible, elastic, rubber sheet 5a. The marginal portion 9 of the sheet 5a is sandwiched between the marginal portions of the sheets 1 and 10 and the rectangular, marginal wall 8 engages the upright peripheral portion of the sheet 10 just as in the cushion A. The sheet is formed with a multiplicity of annular cups 6a which are arranged in rows like the cups 6 with their bottom surfaces in contact with the lower flexible surface 2 and their upper marginal edges in contact with the upper flexible surface 11. If desired, the sheet 5a may be bonded to the sheet 10 but this is not essential.

The chambers 12a formed by the rubber cups 6a and the flexible sheet 10 are shown herein as being in fluid communication with the spaces between the cups and with each other, a small opening 13a being provided in the rounded cup-like wall of each cup 6a to permit flow of air at a limited rate to and from the interior of that cup. The openings 13a of the cushion A² function like the passages 13 of the cushion A and A' to provide a damping action.

The flexible annular wall of each cup 6a gradually increases in thickness from its center to its margin, like the wall of each cup 6, and may have substantially the same thickness as the wall of each cup 6. However, unlike the cup 6, each cup 6a is formed with a central reentrant portion 15 that defines a small cup-shaped auxiliary chamber 16 below the chamber 12a between the portion 15 and the bottom sheet 1. The portions 15 of the cups 6a form auxiliary cushions for yieldably restraining downward movement of the cushion layer 3 when such movement is excessive. Each portion 15 preferably has a maximum height that is in the neighborhood of about one-third to one-half the maximum height of each cup 6a.

Figure 7:
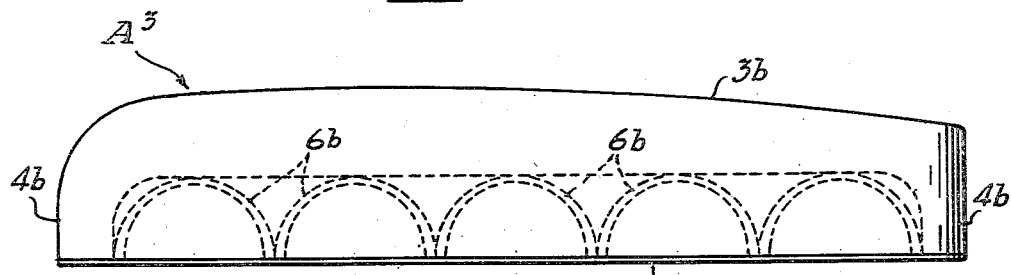
Figure 7 is an end elevational view of the cushion of Fig. 6 on a larger scale.
Figure 8:
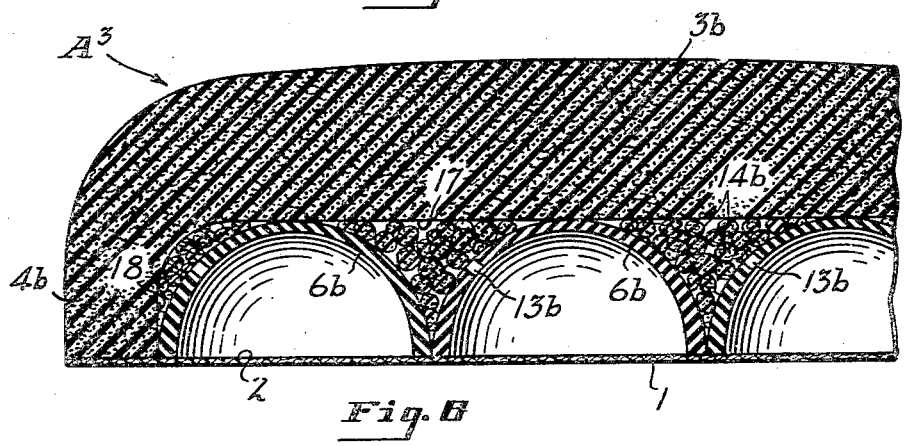
Figure 8 is a fragmentary transverse vertical sectional view of the cushion of Figs. 6 and 7 on a larger scale.

Figures 6 to 8 illustrate another modified cushion A³ made according to the present invention. This cushion is generally of the same shape as the cushion A and includes a flexible elastic sponge rubber cover 3b having an upright rectangular marginal portion 4b that rests on the marginal portion of the flat flexible bottom wall 1. The cover 3b has a flat flexible surface 17 substantially parallel to the flexible upper surface 2 of the sheet 1 and an upright peripheral surface 18 that define a rectangular chamber above the sheet 1.

This chamber may contain cups similar to the cups 6 and 6a of the cushions A and A². It will be apparent that a similar cushioning action may be obtained regardless of the direction in which the cups face. As shown in Figs. 7 and 8, a multiplicity of hemispherical cups 6a are sandwiched between the flexible surfaces 2 and 17 of the cushion A³ and arranged in parallel rows with the marginal portion of each cup engaging the marginal portion of an adjacent cup. Each cup 6b may be the same size and shape as a cup 6 of the cushion A, but as herein shown each cup 6b is molded independently of the other cups and is thereafter bonded to the sheet 1 and/or the adjacent cups. Each cup 6b is formed with a small opening 13b, similar to the opening 13a of each cup 6a, so as to establish limited communication between the air spaces of the cushion. As herein shown, the spaces between the cups 6b and the flexible surface 17 contain a multiplicity of sponge rubber scraps 14b.

The cushion A³ may readily be fabricated from simple inexpensive pieces. The vulcanized hemispheres 6b may be arranged in rows on the sheet 1 and cemented in place thereon. Thereafter scraps of sponge rubber may be placed on the surface 17, the cups 6b inserted in the space within the peripheral surface 18, and the marginal portion of the sheet 2 cemented to the marginal sponge rubber wall 4 of the cushion. If desired the sponge rubber scraps may be omitted, but it is usually preferable to employ such scraps in the spaces between the cups.

It will be understood that, in accordance with the provisions of the patent statutes, variations and modifications of the specific devices disclosed herein may be made without departing from the spirit of the invention.

Having described my invention, I claim:

1. A soft deformable cushion comprising a sheet of flexible material having mounted thereon in side-by-side relation a multiplicity of cups of flexible elastic rubber-like material, each cup having walls that gradually increase in thickness away from the center of the cup.

2. A cushion comprising a multiplicity of closely spaced rounded cups of substantially the same depth arranged with their edges substantially in the same plane and forming a multiplicity of generally hemispherical chambers, said cups being formed of a flexible elastic material, and damping means including a multiplicity of fluid passages establishing communication between said chambers.

3. A soft deformable cushion comprising a single sheet of elastic rubber-like material molded to form alined rows of thin-walled generally hemispherical cups and damping means including passages providing limited communication between said cups.

4. A resilient seat cushion comprising a generally flat bottom sheet, a series of cup-like members of elastic rubber-like material mounted in side-by-side relation on said sheet, said members having substantially the same height and forming a series of expansible and contractible air chambers, means for restricting the flow of air between said chambers and for positioning said cup-like members including a relatively thick layer of sponge rubber having a flat inner surface generally parallel to said sheet and resting on said members, the marginal portion of said sponge rubber layer extending from the plane of said inner surface to said sheet so as to enclose completely the cup-like members.

5. A cushion as defined in claim 4 wherein the spaces between the cup-like members are filled with small pieces of sponge rubber.

6. A cushion as defined in claim 4 wherein said chambers are filled with small pieces of sponge rubber.

7. A cushion as defined in claim 4 wherein said cup-like members have marginal edges facing said sheet.

8. A cushion as defined in claim 4 wherein said cup-like members have marginal edges facing said sponge rubber layer.

9. A cushion as defined in claim 8 wherein each cup-like member has a central re-entrant portion forming a small cup-shaped auxiliary chamber between said sheet and the chamber formed by that member.

10. A cushion element for a seat cushion comprising a thin flexible sheet of elastic rubber-like material formed with a multiplicity of thin-walled cups, each cup having a height substantially the same as the next adjacent cup and having a rounded flexible wall that gradually increases in thickness from the marginal to the central portion of the cup.

11. A cushion element as defined in claim 10 wherein passages are formed in said sheet for establishing limited communication between the interiors of the cups when the ends of the cups are closed.

12. A cushion comprising means forming a first flexible surface, means forming a second flexible surface spaced from said first surface, a multiplicity of elastic rubber-like cups sandwiched between and engaging said surfaces and arranged in side-by-side relation facing one of said surfaces, and passage means for establishing limited communication between the interiors of said cups so as to damp movements of the cushion.

13. A cushion as defined in claim 12 wherein each cup has a thin flexible body portion which gradually increases in thickness from the central to the marginal portion of the cup.

14. A cushion comprising means forming a first flexible surface, means forming a second flexible surface spaced from said first surface, a single sheet of elastic rubber-like material molded to form rows of thin-walled generally hemispherical cups between and engaging said flexible surfaces, and passage means for establishing limited communication between the interiors of said cups, each cup having walls that gradually increase in thickness from the central to the marginal portion of the cup.

15. A cushion as defined in claim 14 wherein each cup has a central re-entrant portion forming a small cup-shaped auxiliary chamber between one of said flexible surfaces and the chamber formed by that cup.

References Cited in the file of this patent

UNITED STATES PATENTS

| | | |
|---|---|---|
| 2,063,081 | Church | Dec. 8, 1936 |
| 2,691,179 | Kann | Oct. 12, 1954 |

FOREIGN PATENTS

| | | |
|---|---|---|
| 389,833 | Great Britain | Mar. 20, 1933 |